United States Patent [19]

Patient et al.

[11] Patent Number: 5,378,053
[45] Date of Patent: Jan. 3, 1995

[54] MAXIMIZED REGENERATIVE BRAKING VEHICLE BRAKING CONTROLLER

[75] Inventors: Daniel J. Patient, Davison, Mich.; Jack R. Phipps, Granger, Ind.

[73] Assignee: AlliedSignal Inc., Morristown, N.J.

[21] Appl. No.: 163,252

[22] Filed: Dec. 7, 1993

[51] Int. Cl.⁶ .............................................. B60T 13/74
[52] U.S. Cl. ....................................... 303/3; 188/156; 188/159; 303/10; 303/100
[58] Field of Search .................. 303/3, 2, 6.01, 15-17, 303/, 20, 9.62, 9.61, 14, 10, 100, 105, 107, 111, 113.5, 112, 115.2, 110, 93, 92; 188/181 T, 159, 271, 158, 156, 106 P, 106 R, 106 F, 349; 364/426.01, 426.02, 426.03; 180/65.1, 65.8, 197, 165; 318/371

[56] References Cited

U.S. PATENT DOCUMENTS

| | | | |
|---|---|---|---|
| 3,621,929 | 11/1971 | Oberthur et al. | 188/156 |
| 3,730,596 | 5/1973 | Felix et al. | 303/15 |
| 4,181,366 | 1/1980 | Dobner | 303/3 |
| 4,270,806 | 6/1981 | Venkataperumal et al. | 303/3 |
| 4,639,047 | 1/1987 | Imanaka | 303/3 |
| 4,659,149 | 4/1987 | Rumsey et al. | 303/3 |
| 4,671,576 | 6/1987 | Fourie | 303/3 |
| 4,671,577 | 6/1987 | Woods | 188/156 |
| 4,850,650 | 7/1989 | Eckert et al. | 303/9.62 |
| 4,962,969 | 10/1990 | Davis | 188/181 T |
| 5,222,787 | 6/1993 | Eddy et al. | 303/10 |
| 5,253,929 | 10/1993 | Ohori | 303/3 |

Primary Examiner—Douglas C. Butler
Attorney, Agent, or Firm—Leo H. McCormick, Jr.; Larry J. Palguta

[57] ABSTRACT

A vehicle powered by an electric motor which may be operated as a generator to effect regenerative braking of certain vehicle wheels in combination with individual friction brakes associated with other wheels. A commanded vehicle deceleration is apportioned among the wheels by determining the maximum regenerative braking deceleration achievable by drive wheels, and braking the vehicle occurs solely by regenerative braking so long as the commanded deceleration is less than the determined maximum deceleration. When a commanded deceleration exceeds the determined maximum, the regenerative braking is supplemented with friction braking of the other wheels while the maximum regenerative braking is maintained. The maximum regenerative braking of the certain wheels may be supplemented with additional friction braking of those same certain wheels, but this occurs only if the combined deceleration of the regenerative braking of the certain wheels and the friction braking of the other wheels is inadequate to achieve the commanded deceleration.

5 Claims, 5 Drawing Sheets

MAXIMIZED REGENERATIVE BRAKING VEHICLE BRAKING CONTROLLER

The present invention relates generally to vehicle braking systems and more particularly to such braking systems as applied to electrically powered vehicles.

BACKGROUND OF THE INVENTION

U.S. Pat. No. 4,270,806 discloses a brake system having combined hydraulic and regenerative braking for an electrically powered vehicle. In this brake system a mix occurs between the hydraulic and regenerative braking at lower braking efforts, but for all braking efforts above a specified hydraulic line pressure, braking is entirely hydraulic. In addition, the regenerative contribution decreases for increasing braking effort in a lower range of line pressures. This reduction or elimination of regenerative braking is both undesirable and unnecessary. Disposing of the kinetic energy of vehicle motion by dissipating heat in friction braking pads is wasteful of our precious energy resources. While it can not be altogether avoided such wastefulness should be reduced as far as possible. Further, this brake system makes no provision for the incorporation of an anti-skid feature which is a safety feature desired by may customers.

U.S. Pat. No. 4,850,650 discloses an anti-skid braking system having both a high level supervisory control and a low level (local) control. The low level control attempts to maintain the individual wheel performance near that commanded by the high level and the high level attempts to optimize overall braking performance, e.g., by distributing the braking effort between the front and rear wheels based on dynamic front and rear axle weights.

U.S. Pat. No. 5,222,787 discloses an electro-hydraulic braking system having an electronic control which separates the front and rear braking efforts. This brake system is a basis for the for the present invention and reference may be had thereto for some of the details of the electro-hydraulic portion of the braking system of the present invention.

SUMMARY OF THE INVENTION

The present invention overcomes the above noted deficiencies by providing an optimized regenerative braking system for an electrically powered vehicle in this brake system, the front wheels are drivingly coupled to an electric motor which may be selectively operated as a generator convert kinetic energy of the vehicle into stored energy as for example into a battery. The stored energy may thereafter provide regeneratively braking for the front wheels in addition to individual friction brakes associated with all of the wheels. A braking task is apportioned by a brake controller between the front and rear wheels in a way to maximize regenerative braking by first determining if the requested deceleration (translated into a total torque requirement can be achieved with regeneration alone (either by a stored relationship between torque limit and speed or by obtaining the current value from the power plant controller, taking into account the state of charge of the battery, temperatures, etc. If the applied level of regenerative braking torque causes an ABS event on the drive axle, its torque is reduced to a value which will allow the wheel(s) to recover from the skid condition (typically about 60% of the lockup torque). The regenerative torque is then commanded to rise relatively slowly to a value near the original lockup value (~90%). In situations where there is appreciable difference from one side of the vehicle to the other, the lowest wheel torque value causing a wheel to skid is the value used to determine regenerative brake torque. When the drive axle wheels cannot achieve the level of deceleration desired by the driver, the rear brakes which are braked by frictional engagement are brought into play to supplement the deceleration caused by the front wheels. In some circumstances it may happen that the current maximum level of regeneration has not forced an ABS event, and the supplemental braking action on the rear wheels has reached a sufficient magnitude to cause the rear wheels together the antilock mode, under these conditions additional braking torque can be added to the front (drive) wheels through the actuation of the friction brakes, up to the limit of drive wheel adhesion (slip).

BRIEF DESCRIPTION OF THE DRAWING

Corresponding reference characters indicate corresponding parts throughout the several views of the drawings.

DESCRIPTION OF THE PREFERRED EMBODIMENT

Figure 1:
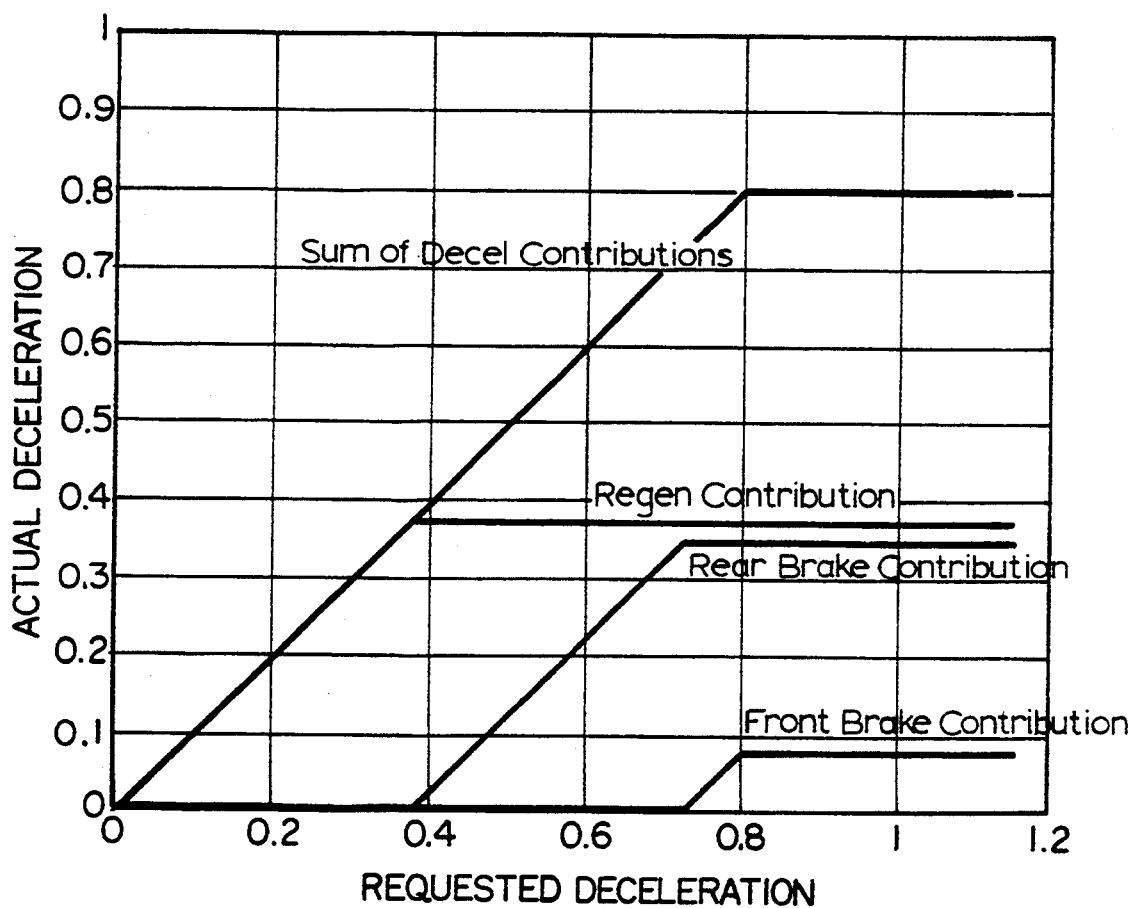
FIG. 1 is a graph illustrating a preferred apportionment of a breaking task among a regenerative brake and front and rear friction brakes.
Figure 2:
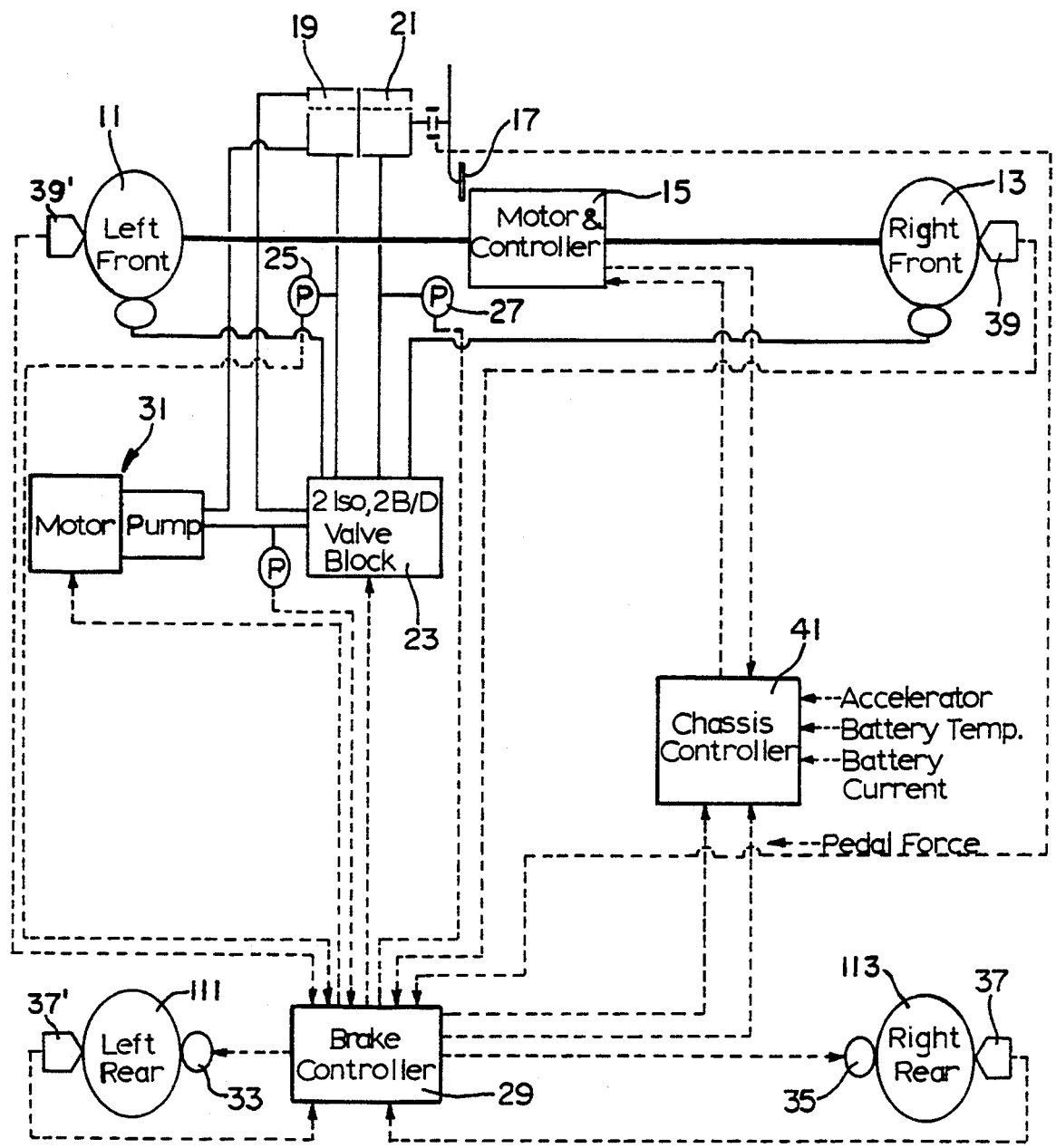
FIG. 2 is a schematic representation of a braking system incorporating the present invention.

In FIG. 1 is a graph which shows actual vehicle deceleration as a function of operator requested deceleration to achieve maximize regenerative braking in accordance with the present invention for a brake system shown in FIG. 2. The braking effort is all regenerative up to a maximum (here about 0.38 g where g is the acceleration of gravity) and thereafter, the regenerative contribution is maintained constant at this maximum. In this brake system, the regenerative braking is only associated with the front wheels. Additional braking is supplied by standard friction braking of the rear wheels until the combined braking effort approaches a skid condition (here about 0.35 g actual deceleration). Additional friction braking of the front wheels is available since the front wheels are regenerative limited. Thus, while maintaining maximum regenerative braking, this braking is supplemented by friction braking first of the non-driven (rear) wheels and thereafter by further friction braking of the already regeneratively braked wheels up to the skid point of the front wheels.

In the brake system shown in FIG. 2, an electrically powered vehicle has certain wheels such as the front wheels 11 and 13 which are coupled to and powered by an electric motor 15. Motor 15 is typically an electronically commutated DC motor, other drive motors may be acceptable, which may also be operated as a generator to effect regenerative braking of the front wheels. An operator controlled brake pedal 17 supplies an input force to a vacuum brake booster which provides a force to pressurize fluid in chambers 19 and 21 of a master cylinder to provide hydraulic pressure by way of control valve 23 to brake the front wheels 11 and 13. A first pressure sensor 25 associated with chamber 19 and a second pressure sensor 27 associated with chamber 21 provides input information to the brake controller 29 which controls the operation of motor and pump combination 31 to provide friction braking of the front wheels in a manner as fully described in the U.S. Pat. No. 5,222,787 patent which is incorporated herein by reference. However it should be pointed out that the two front wheels 11 and 13 are braked independently. In addition, brake controller 29 controls motors which provide a force to frictionally brake the rear wheels 111 and 113. Further, rear wheel 111 has a wheel speed sensor 37' and an electrically operated friction brake 33 and rear wheel 113 has a wheel speed sensor 37 and an electrically operated friction brake 35 which provide information to controller 29 for anti-skid purposes. Overall the drive motor control and coordination 31 with the braking controller 29 is performed by a chassis controller 41 which receives information regarding many operational parameters (e.g. temperature, altitude, battery voltage, accelerator position, requested torque, odometer speed, navigational location, environmental air velocity, and etc.) of the vehicle.

Figure 3:
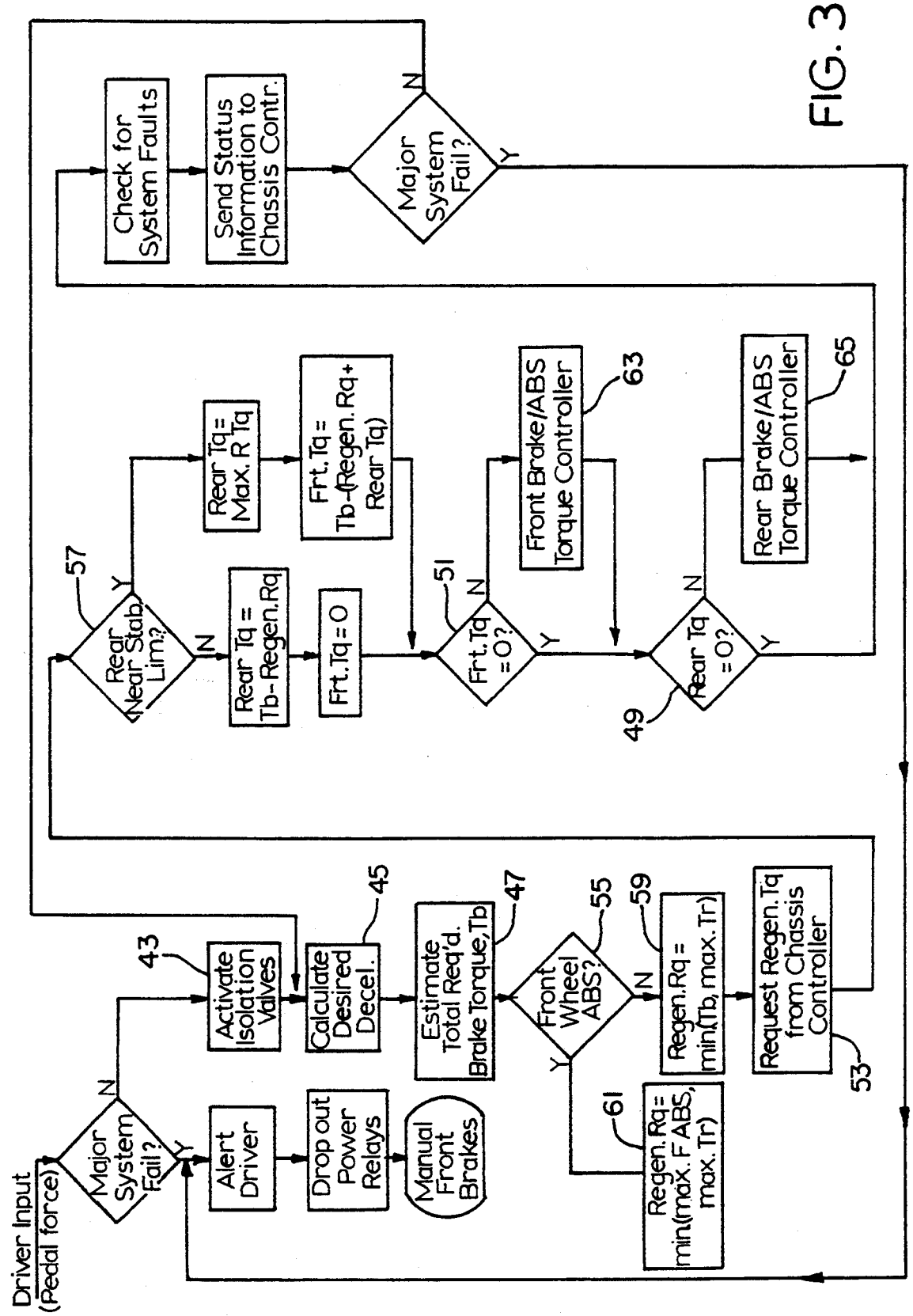
FIG. 3 is a flow chart indicating a method of determining an apportionment of a braking task.

The operation of the brake controller 29 and its functional interaction with the chassis controller 41 is illustrated generally by the flow chart of FIG. 3. The control valve 23 shown in FIG. 2 is activated at step 43 in the flow chart. The following definitions are for various steps in the flow chart and were used in the calculation and estimate are based on the pedal 17 force and the velocity of the vehicle.

Frt Tq=Commanded Front Brake Torque (Friction Brakes);
Max F ABS=Maximum Regeneration Torque Road condition Support;
Max R Tq=Maximum Rear Brake Torque Supported by Road Conditions;
Max Tr=Maximum Available Regeneration Torque;
Max Tq=Command Rear Brake Torque;
Regen Rq=Regeneration Torque Requested by Brake Controller to Chassis Controller; and
Tb=Estimated Total Required Brake Torque Other than major system failures, only four tests are deemed necessary to achieve the regenerative and hydraulic braking of a vehicle of the present invention. These four test are illustrated in FIG. 3. Test 49 asks if the commanded rear torque is zero. Test 51 asks if the commanded front wheel torque is zero. Test 57 asks if the regenerative torque as obtained from the chassis controller 41 at 53 is near the front stability limit. Requested torque from the chassis controller 41 is based on a test 55 as to whether the front wheels 11 or 13 is experiencing an ABS event or function (incipient skid). If either wheel 11 or 13 is experiencing an ABS function, brake controller 29 request the maximum regenerative torque which the road conditions will support from the chassis controller 41. Otherwise the total required torque is requested. Note, test steps 59 and 61 each select the lesser of a maximum torque value and the estimated required torque from test step 47. In test step 59, the estimated torque is compared to the maximum available regeneration torque which is the maximum torque the electric motor 15 and its associated electrical components can absorb without damage. In test step 61 the estimated total torque is compared to applied torque just prior to wheel slippage due to surface friction limitations. When wheel slippage as detected by wheel speed sensors 39, 39' detected the regenerative braking is reduced. Test steps 63 and 65 refer to the anti-lock control process or function in a standard manner to control torque while preventing to preventing wheel lock up. In the case of the front brake controller 63, the sensing for the maximum deceleration prior to wheel slippage due to surface friction limitations is made for each of the front wheels 11 and 13 and any additional frictional braking need is only applied to that wheel which is decelerating at a rate which is less than the corresponding sensed maximum deceleration.

Figure 4:
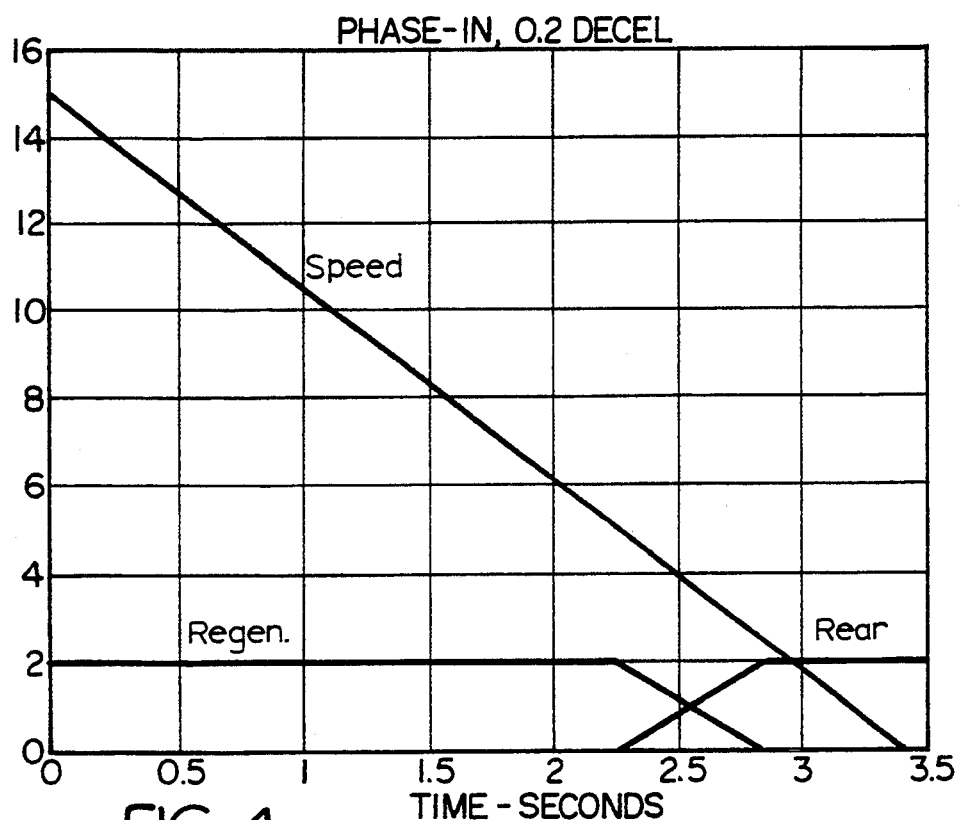
FIG. 4 is a graph illustrating the low speed phase out of regenerative braking for a moderately low deceleration rate.

Below a certain speed regenerative braking may be ineffective and necessitates the introduction of friction braking of the vehicle. As shown in FIG. 4, the speed of the vehicle is reduced linearly by a constant relatively low regenerative deceleration braking until that speed reaches about five miles per hour at which time regenerative braking is phased out and friction braking of the rear wheels 111 and 113 is instituted.

Figure 5:
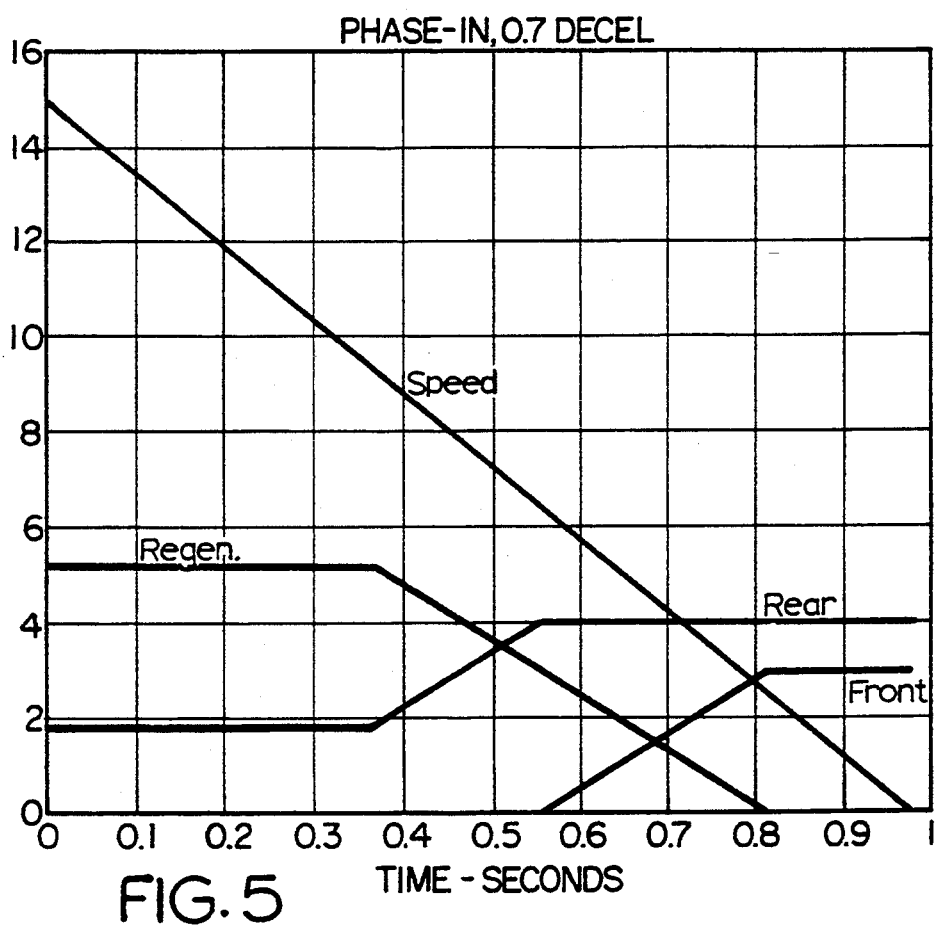
FIG. 5 is a graph similar to FIG. 4, but illustrating the low speed phase out of regenerative braking for a fairly high deceleration rate.

FIG. 5 illustrates a significantly greater (constant) deceleration than is shown in FIG. 4 in effecting a brake application to linearly reduce the speed of a vehicle. Between nine and ten miles per hour, friction braking of the rear wheel 111 and 113 is instituted and replaces some of the total braking of the regenerative braking. At about seven miles per hour, the frictional braking of the rear wheels 111 and 113 reaches its frictional limit and frictional braking is also instituted for the front wheel 11 and 13.

Figure 6:
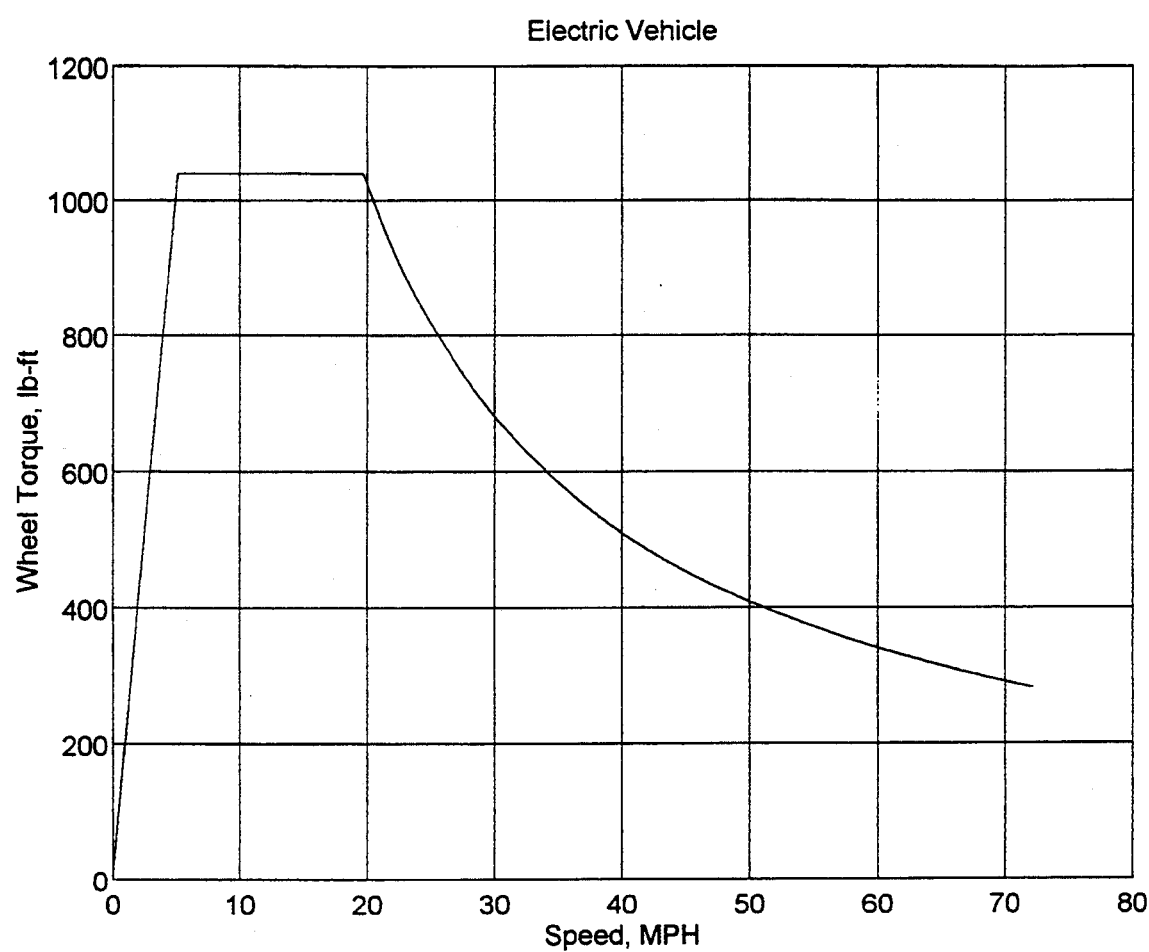
FIG. 6 is a graph illustrating maximum absorbable torque at low speeds wherein friction braking is desirable.

In both FIGS. 4 and 5, stopping of the vehicle from a predetermined speed which in this example was selected to be three miles per hour is solely by application of the friction brakes. FIG. 6 illustrates a characteristic reduction in absorbable torque at low speeds, which results in the necessity for, in all cases, using friction braking for the front and rear wheel brakes at the end of the stop. The point at which friction braking begins to phase in to supplement regenerative braking is determined by speed and the desired decelerating torque.

In the event of a failure of the regenerative braking function, pressurized fluid from chambers 11 and 13 of the master are directly communicated from control valve 23 to the front wheels 11 and 13 to provide for frictional braking.

In summary, this invention has a number of advantages over known prior regenerative braking systems paramount of which is the maximization of the regenerative braking as opposed to the friction braking, and the correlative minimization of energy loss in the form of thermal energy.

What is claimed is:

1. In an electrically powered apparatus having front drive wheels coupled to and powered by at least one electric motor selectively operated as a generator to effect regenerative braking of said front wheels, and having individual friction brakes associated with, said front wheels and with rear wheels, the method of apportioning a commanded vehicle deceleration braking task among the wheels comprising:
   determining the maximum regenerative braking deceleration achievable by said front wheels;
   braking the vehicle solely by regenerative braking at the front wheels so long as the commanded deceleration is less than the determined maximum deceleration;

maintaining the maximum regenerative braking and supplementing the regenerative braking with friction braking of said rear wheels and in the event the commanded deceleration exceeds the determined maximum;

further supplementing the maximum regenerative braking of said front wheels with additional friction braking of those front wheels if the combined deceleration of the regenerative braking of said front wheels and the friction braking of said rear wheels is inadequate to achieve the commanded deceleration; and sensing vehicle speed and disabling the regenerative braking when vehicle speed is below a predetermined threshold such that braking is achieved solely by friction braking of said front and rear wheels.

2. The method of claim 1 wherein the predetermined threshold is about three miles per hour.

3. The method of claim 1 wherein the step of determining the maximum regenerative braking deceleration includes:

sensing for the maximum deceleration prior to wheel slippage due to surface friction limitations; and determining the deceleration associated with the maximum torque that said electric motor can absorb without damage, and selecting the smaller deceleration as the maximum.

4. The method of claim 3 wherein the maximum regenerative braking is reduced slightly in the event that the maximum deceleration is determined by friction limitations.

5. The method of claim 1 including the additional step of:

sensing for the maximum deceleration prior to wheel slippage due to surface friction limitations for each of said drive wheels; and applying the additional frictional braking only to wheels which are decelerating at a rate which is less the corresponding sensed maximum deceleration.

* * * * *